(12) United States Patent
Koehler et al.

(10) Patent No.: US 10,550,974 B2
(45) Date of Patent: Feb. 4, 2020

(54) RETAINING CLAMP WITH INTERCONNECTED SEGMENTS

(71) Applicants: IDEAL CLAMP PRODUCTS, INC., Smyrna, TN (US); Edwin T. Koehler, Smyrna, TN (US); Bruce D. Bowater, Smyrna, TN (US); Vijay Anumandla, Smyrna, TN (US)

(72) Inventors: Edwin T. Koehler, Smyrna, TN (US); Bruce D. Bowater, Smyrna, TN (US); Vijay Anumandla, Smyrna, TN (US)

(73) Assignee: IDEAL CLAMP PRODUCTS, INC., Smyrna, TN (US)

( * ) Notice: Subject to any disclaimer, the term of this patent is extended or adjusted under 35 U.S.C. 154(b) by 1040 days.

(21) Appl. No.: 14/784,199

(22) PCT Filed: Apr. 15, 2014

(86) PCT No.: PCT/US2014/034071
§ 371 (c)(1),
(2) Date: Oct. 13, 2015

(87) PCT Pub. No.: WO2014/172303
PCT Pub. Date: Oct. 23, 2014

(65) Prior Publication Data
US 2016/0053783 A1    Feb. 25, 2016

Related U.S. Application Data

(60) Provisional application No. 61/812,073, filed on Apr. 15, 2013.

(51) Int. Cl.
| | | |
|---|---|---|
| *F16L 23/08* | (2006.01) | |
| *B21D 53/36* | (2006.01) | |
| *F16B 2/08* | (2006.01) | |

(52) U.S. Cl.
CPC .............. *F16L 23/08* (2013.01); *B21D 53/36* (2013.01); *F16B 2/08* (2013.01)

(58) Field of Classification Search
CPC .. F16L 23/08; F16L 21/06; F16B 2/08; B21D 53/36
USPC .......................... 285/407, 409, 410, 411, 420
See application file for complete search history.

(56) References Cited

U.S. PATENT DOCUMENTS

| | | | | |
|---|---|---|---|---|
| 2,548,216 A | * | 4/1951 | Houghton | ............... F16L 23/08 285/411 X |
| 2,717,788 A | | 7/1951 | Raynes | |
| 3,029,095 A | * | 4/1962 | King | ............................. 285/411 |
| 3,099,060 A | | 7/1963 | Smith | |
| 3,669,474 A | * | 6/1972 | Bode | ......................... 285/407 X |

(Continued)

OTHER PUBLICATIONS

PCT Search Report and Written Opinion for PCT/US2014/034071, completed Aug. 4, 2014.

*Primary Examiner* — Zachary T Dragicevich
(74) *Attorney, Agent, or Firm* — Barnes & Thornburg LLP

(57) ABSTRACT

A retaining clamp for securing the joints that connect ducting, tubing, filters, or other components is disclosed. The retaining clamp includes a chain of segments that defines a central axis, and a locking mechanism coupled to a first end of the chain and a second end of the chain. A groove is defined in each segment, and the groove is sized to receive a joint connecting ducting, tubing, filters, or other components.

17 Claims, 10 Drawing Sheets

(56) References Cited

U.S. PATENT DOCUMENTS 3,822,075 A * 7/1974 Duncan
2007/0126234 A1 6/2007 Wirth et al.

* cited by examiner

RETAINING CLAMP WITH INTERCONNECTED SEGMENTS

CROSS REFERENCE TO RELATED APPLICATIONS

This application is a national stage entry under 35 USC § 371(b) of PCT International Application No. PCT/US2014/034071, filed Apr. 15, 2014, and claims priority to U.S. Provisional Application Ser. No. 61/812,073, which was filed on Apr. 15, 2013, both of which are expressly incorporated herein by reference.

BACKGROUND

The present disclosure relates to clamp designs and, more specifically, to a design for a retaining clamp.

TECHNICAL FIELD

Retaining clamps may be to secure the joints that connect ducting, tubing, filters, and other components. One type of retaining clamp is a V-band clamp, which includes multiple segments that are spot welded, riveted, or otherwise fastened to a circular outer band. Each segment of a V-band clamp may be of equal length and radius and may have a v-shaped cross-section. A locking mechanism is used to couple the ends of the outer band together and apply tension to the clamp. A radial load may be created by the tension and may be transmitted to the mating flanges of the joint as an axial load.

One example of a typical V-band clamp 10 including a number of segments 12 that are secured to a circular outer band 14 is shown in FIG. 1. The clamp 10 also includes a locking mechanism 16 that has a T-bolt 18 and a trunnion 20 to secure the ends 22, 24 of the outer band 14 together. A strip of metal may be roll-formed or stamped to create a segment 12 and form the V-shape cross-section shown in FIG. 2. The material type, gauge thickness, and other dimensions of the clamp 10 may be selected based on the strength and temperature requirements of the application.

SUMMARY

According to one aspect, a retaining clamp is disclosed. The retaining clamp includes a chain of interconnected segments extending from a first end to a second end. The chain defines a central axis. The retaining clamp also includes a latch extending between the first end of the chain and the second end. The locking mechanism is operable to move the first end toward the second end. A groove is defined in each segment of the chain of interconnected segments. The groove is defined by a base wall that faces the central axis and a pair of side walls extending obliquely relative to the base wall. An angle is defined between the pair of side walls. The angle has a magnitude of approximately 40 degrees.

In some embodiments, the groove of each segment may have a depth defined between the base wall and an inner edge of the segment.

In some embodiments, each segment may extend from a first end to a second end and may have an inner length defined between the first end and the second end. A radial line may extend through the central axis and a midpoint of the inner length of each segment and orthogonal to the inner edge of the segment.

In some embodiments, the midpoints of the lengths of the segments may define a circle. The inner edge of each segment may extend along a tangent line of the circle.

In some embodiments, each segment may have an outer surface that faces away from the central axis. The outer surface may have a midpoint that is aligned with the midpoint of the inner length of the segment such that a radial line extends through the central axis, the midpoint of the inner length of the segment, and the midpoint of the outer surface of the segment.

According to another aspect, the retaining clamp includes an annulus including a plurality of segments. The annulus defines a central axis. The retaining clamp also includes a locking mechanism coupled to the annulus and a second end of the annulus. The locking mechanism is operable to contract the annulus. A groove is defined in each segment, and the groove extends from an inner edge of each segment to a base wall facing the central axis. A radial line extends through the central axis and a midpoint of the inner edge of each segment orthogonal to the inner edge of the segment.

In some embodiments, the segments may be formed from a single metallic strip.

According to another aspect, a method of manufacturing a retaining clamp is disclosed. The method includes producing a generally flat metal strip including a first plurality of protrusions extending in first direction and a second plurality of protrusion extending in a second direction opposite the first direction, producing a generally flat metal strip including a first plurality of protrusions extending in first direction and a second plurality of protrusion extending in a second direction opposite the first direction, bending a first protrusion of the first plurality of protrusions such that a tip of the first protrusion contacts a flat surface of the metal strip, bending a second protrusion of the second plurality of protrusions such that a tip of the second protrusion contacts the flat surface of the metal strip and a groove is defined between the first protrusion and the second protrusion, rolling the metal strip to form an annulus having a central axis, and securing a first end of the annulus to a second end of the annulus, wherein the plurality of grooves face the central axis of the annulus.

BRIEF DESCRIPTION OF THE DRAWINGS

The detailed description particularly refers to the following figures, in which.

DETAILED DESCRIPTION OF THE DRAWINGS

Figure 1:
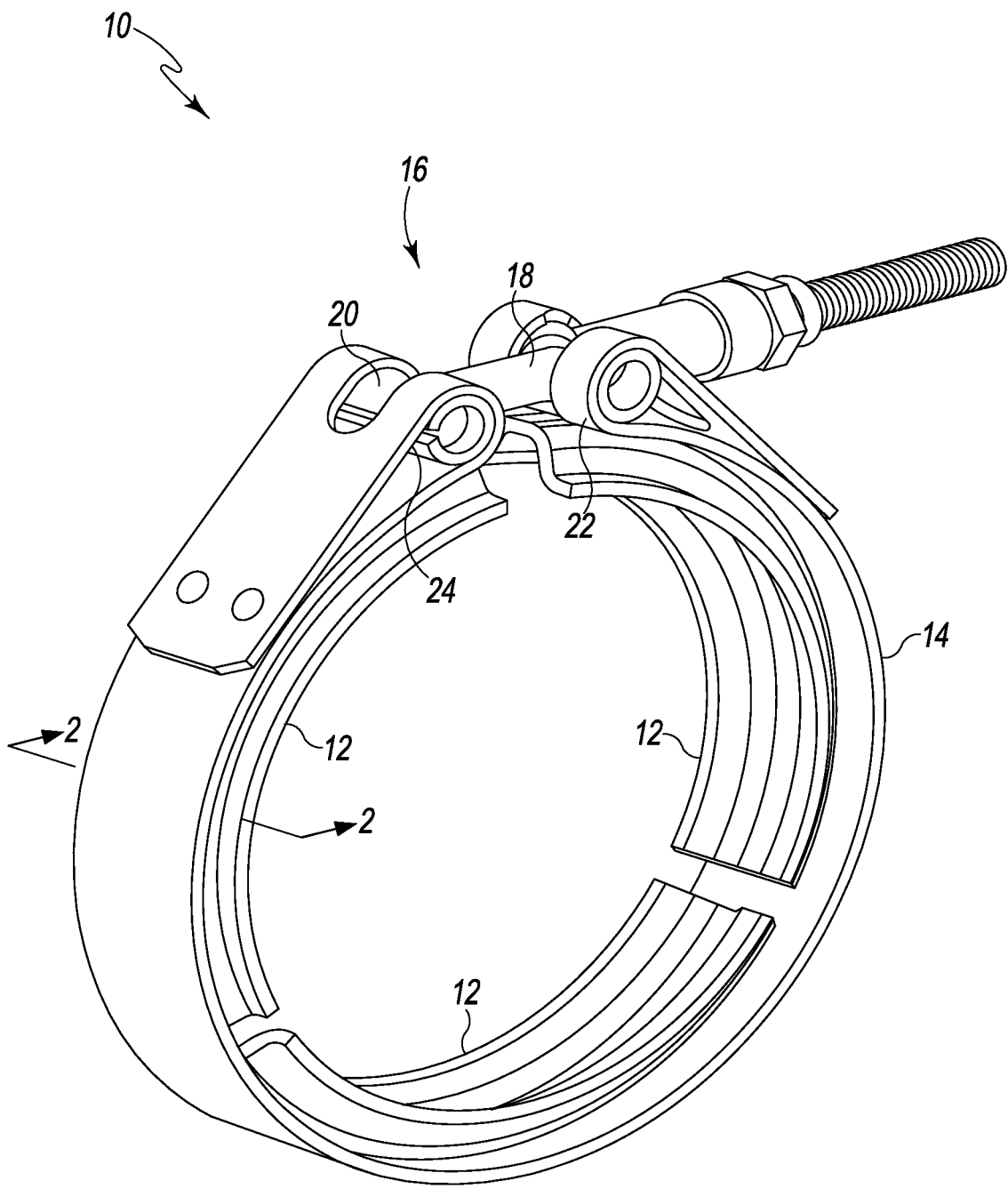
FIG. 1 is a perspective view of a typical V-band clamp.
Figure 2:
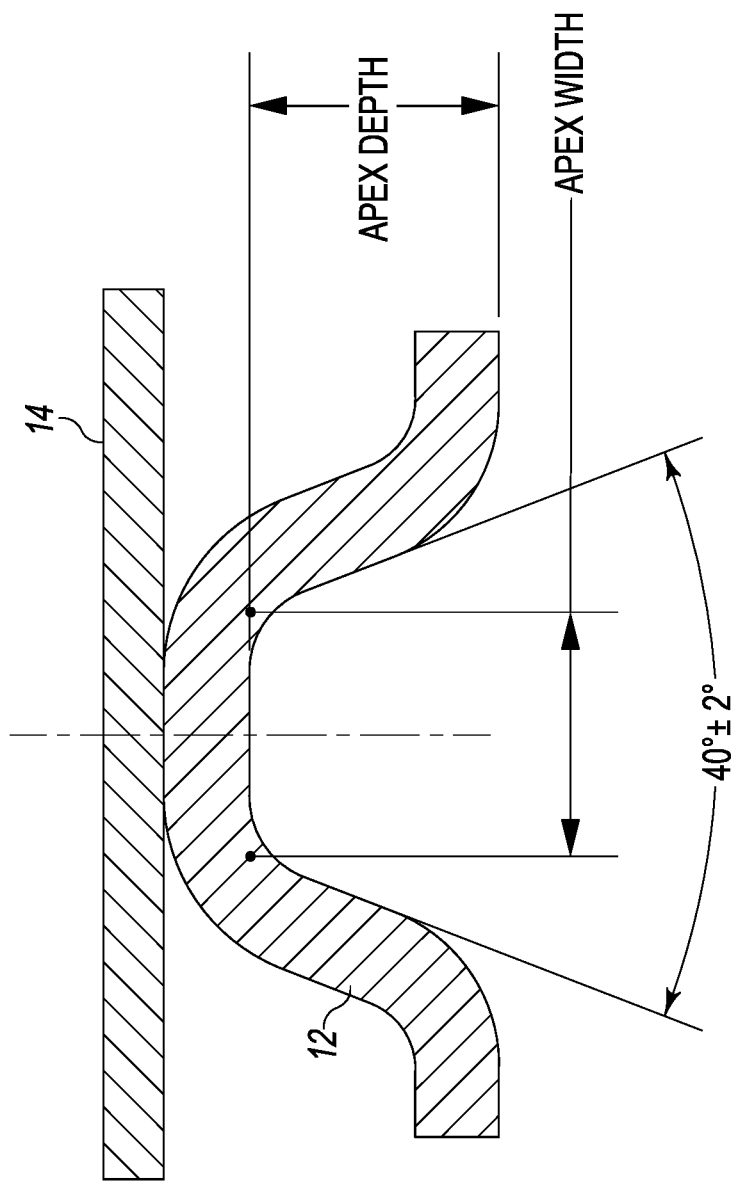
FIG. 2 is a cross-sectional view of the V-band clamp taken along the line 2-2 of FIG. 1.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 3:
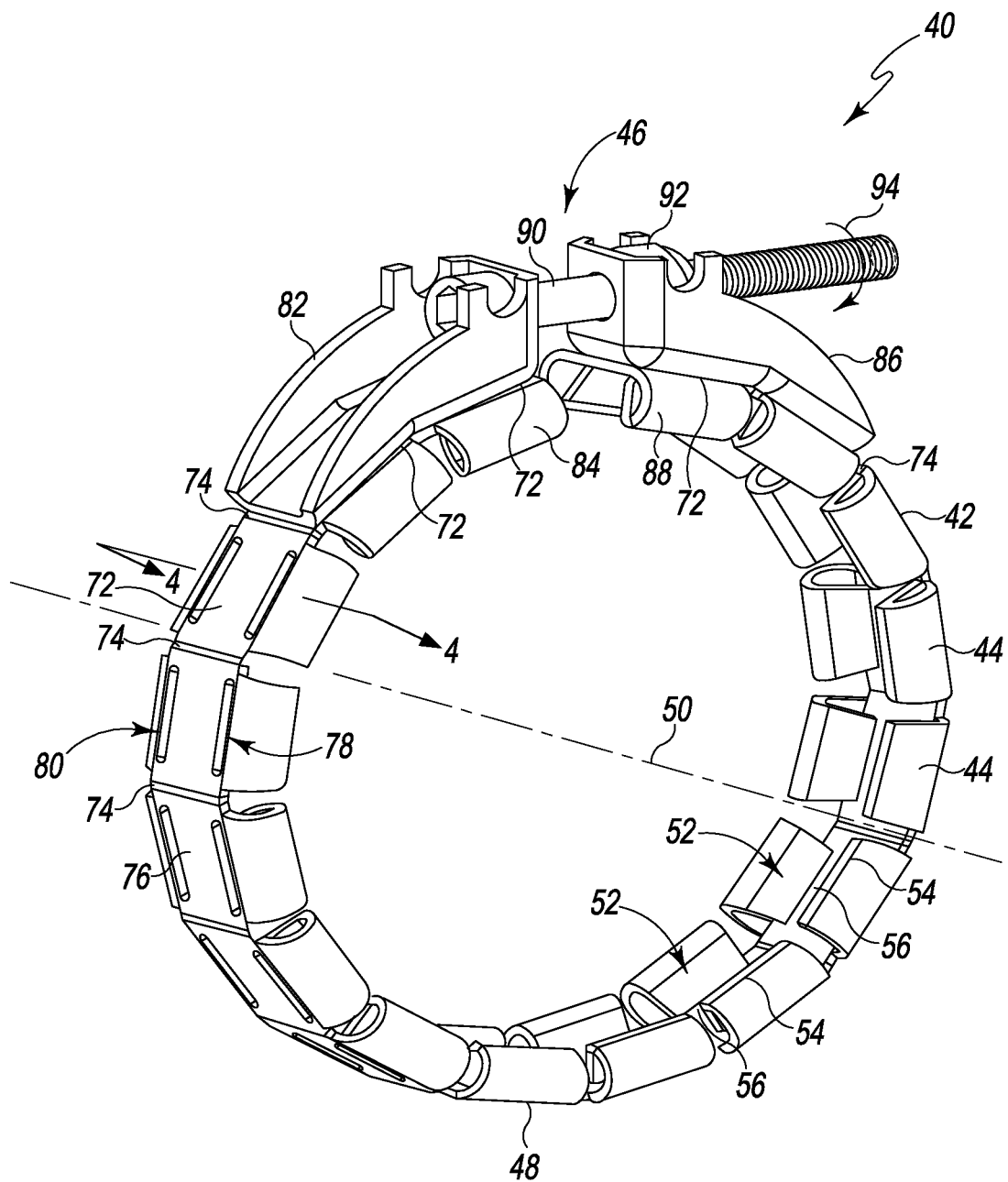
FIG. 3 is a perspective view of a retaining clamp including interconnected segments.
Figure 4:
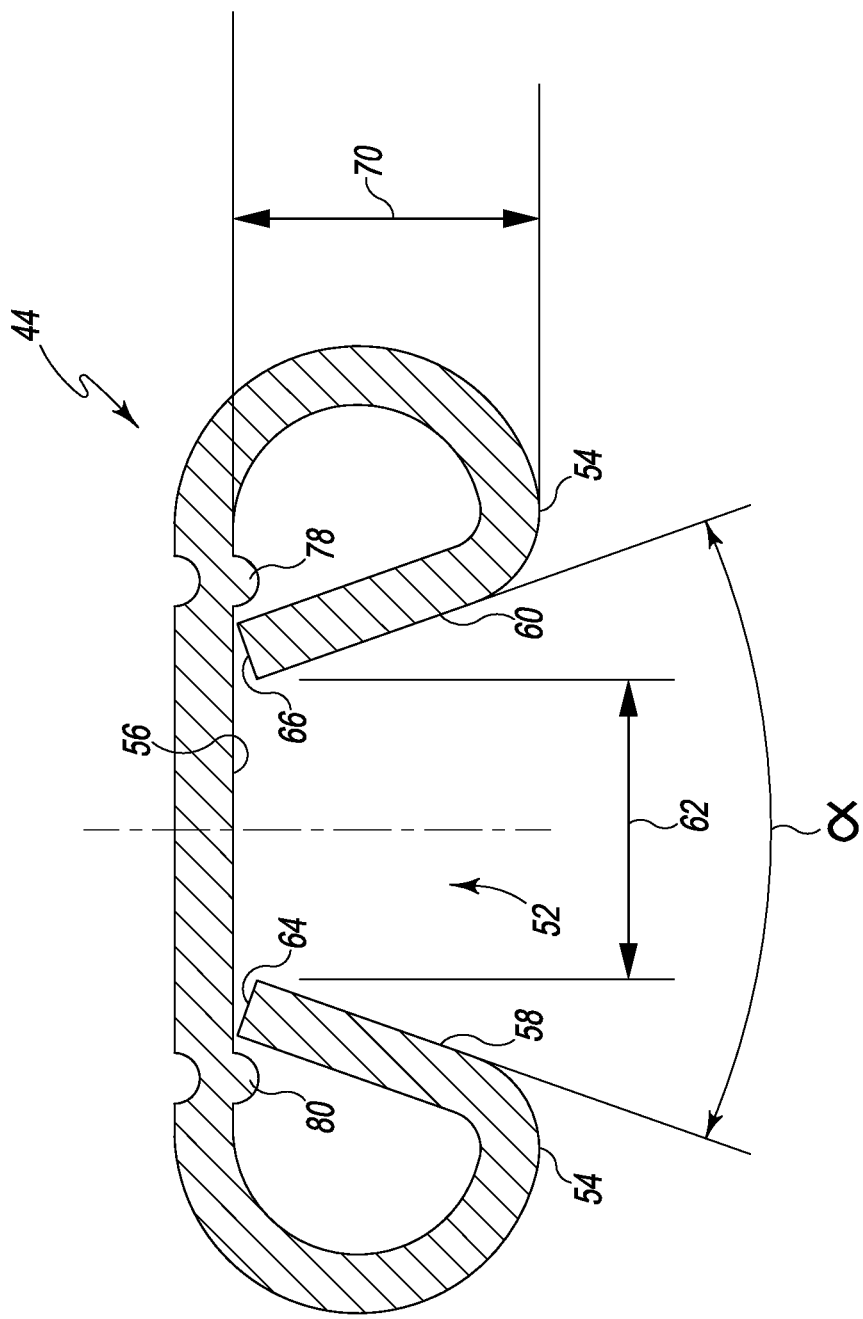
FIG. 4 is a cross-sectional view of the retaining clamp taken along the line 4-4 of FIG. 3.
Figure 5:
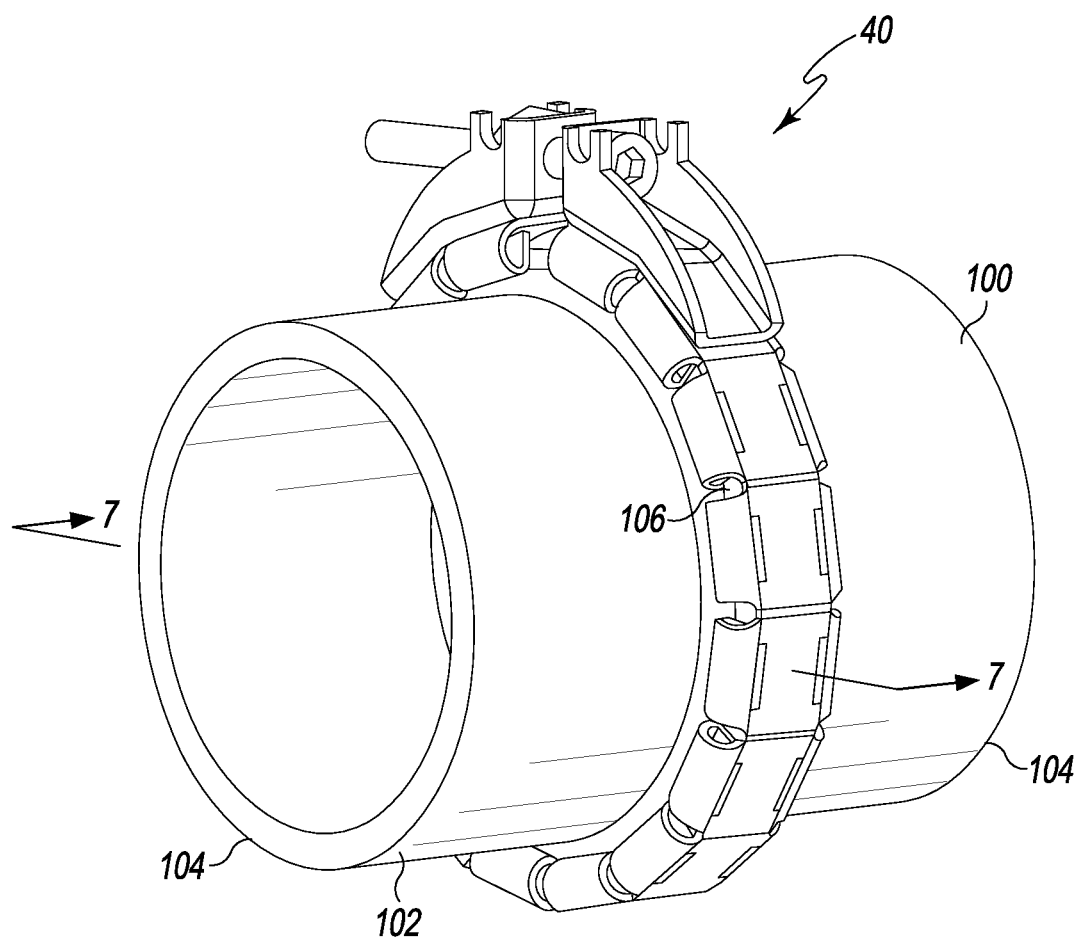
FIG. 5 is a perspective view of the retaining clamp of FIG. 3 coupled to a joint.

Referring now to FIGS. 3-4, a retaining clamp 40 is shown. The retaining clamp 40 includes a band or chain 42 formed from a number of segments 44 and a locking mechanism 46 secured to the chain 42. In the illustrative embodiment, the chain 42 is formed from a metallic material such as, for example, a stainless steel or aluminum strip. As shown in FIG. 3, the thickness of the strip is approximately 0.048 inches. In other embodiments, the thickness may be between 0.030 and 0.080 inches. It should be appreciated that in other embodiments the chain 42 may be formed from a semi-rigid polymeric material.

As shown in FIG. 3, the chain 42 defines an annulus 48 having a central axis 50. Each segment 44 of the chain 42 is toroidal and has a groove 52 that faces the central axis 50. In the illustrative embodiment, each groove 52 extends from an inner edge 54 of each segment 44 to a base wall 56. The base wall 56 in the illustrative embodiment is substantially planar. As shown in FIG. 4, each segment 44 includes a pair of side walls 58, 60 that extend obliquely relative to the base wall 56. The side walls 58, 60 cooperate with the base wall 56 to define the groove 52. In the illustrative embodiment, the groove 52 has a V-shape.

Each groove 52 has an apex width 62 defined between the tips 64, 66 of the side walls 58, 60, respectively. In the illustrative embodiment, the apex width 62 is at least 0.200 inches. Each groove 52 also has a depth 70 defined between the base wall 56 and the inner edge 54 of each segment 44. In the illustrative embodiment, the depth 70 is at least three times the thickness of the strip forming the chain 42. As shown in FIG. 4, an angle α is defined between the side walls 58, 60. In the illustrative embodiment, the angle α has a magnitude of approximately 40 degrees. In other embodiments, the magnitude of the angle α may be between 36 degrees and 42 degrees. It should be appreciated that the magnitude of the angle α, the depth 70, and the apex width 62 may vary according to the size of the joint.

Each segment 44 also has an outer surface 72 that is positioned opposite the base wall 56. As shown in FIG. 3, the outer surface 72 of each segment 44 is substantially planar. The outer surfaces 72 cooperate to define the outer perimeter 76 of the chain 42. A living hinge 74 extends between each segment 44, interconnecting adjacent segments 44. The living hinge 74 permits the annulus 48 to contract when the locking mechanism 46 is operated, as described in greater detail below.

As shown in FIGS. 3 and 4, a pair of detents 78, 80 is formed in each segment 44 adjacent to the tips 64, 66 of the sidewalls 58, 60, respectively. In the illustrative embodiment, the detents 78, 80 act as stops for the tips 64, 66 to maintain the apex width 62 when the clamp 40 is secured to a joint. In the illustrative embodiment, the detents 78, 80 extend inward; it should be appreciated that in other embodiments the detents may extend outward from the outer surface 72. It should also be appreciated that in embodiments where the clamp load is relatively small, the detents 78, 80 may be omitted.

As described above, the clamp 40 includes a locking mechanism 46. As shown in FIG. 3, the locking mechanism 46 has a bracket 82 secured to an outer surface 72 of a segment 44 at the end 84 of the chain 42 and another bracket 86 secured to another outer surface 72 at an opposite end 88 of the chain 42. In the illustrative embodiment, the brackets 82, 86 are formed from a metallic material and are welded to the ends 84, 88 of the chain 42. In other embodiments, the brackets 82, 86 may be secured to the ends 84, 88 of the chain 42 by other mechanical means.

A fastener such as, for example, a bolt 90 extends through openings (not shown) defined in the brackets 82, 86. In the illustrative embodiment, the bolt 90 is threaded into a nut 92 positioned in the bracket 86. When the bolt 90 is rotated in the direction indicated by arrow 94 in FIG. 3, the bracket 86 is drawn toward the bracket 82, thereby decreasing the distance between the ends 84, 88 of the chain 42 and contracting the annulus 48 of the clamp 40. It should be appreciated that in other embodiments the locking mechanism 46 may include a T-bolt and trunnion latch, a quick release latch, or other fastening devices.

Figure 6:
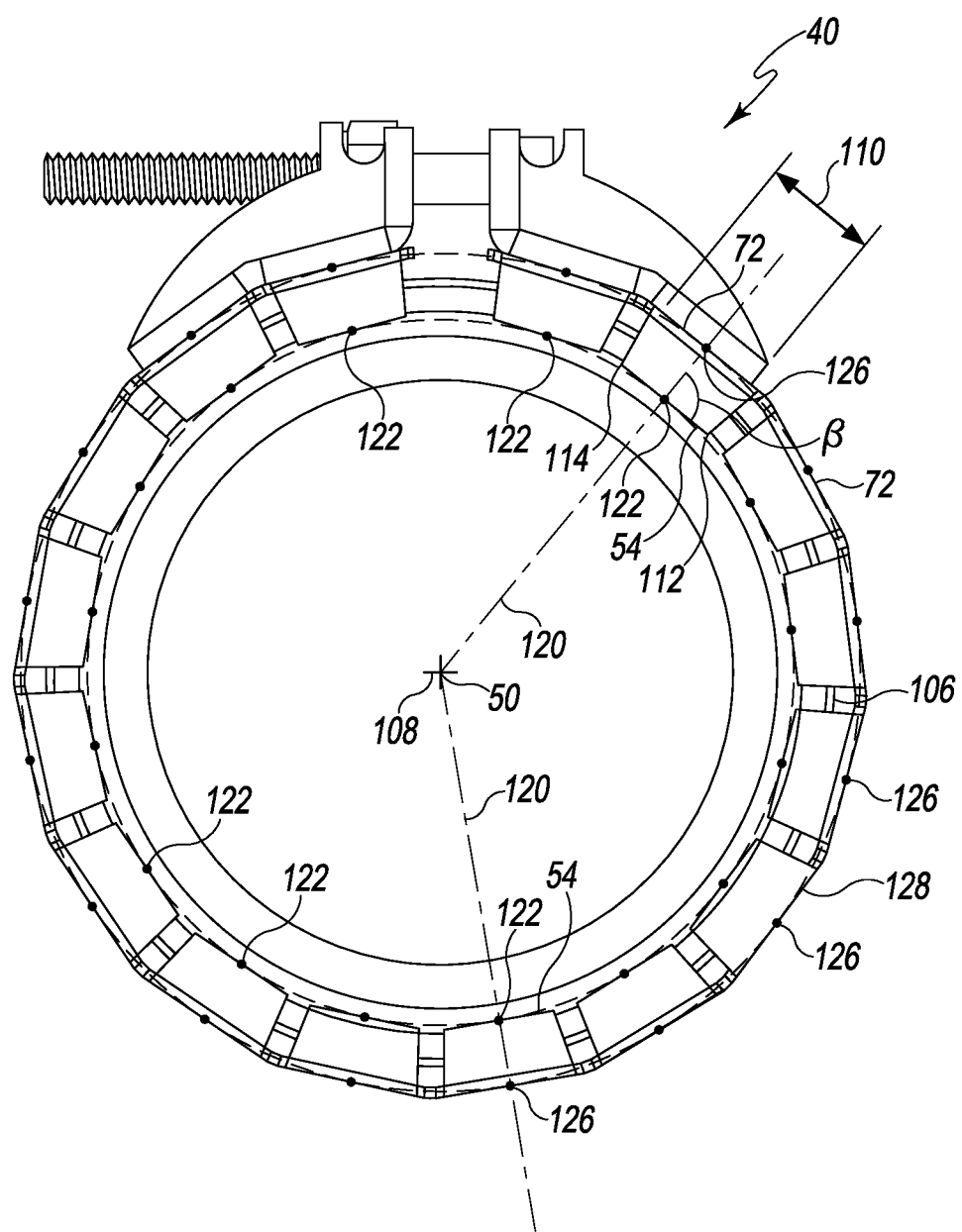
FIG. 6 is a side elevation view of the retaining clamp and joint of FIG. 5.

As shown in FIGS. 5-8, a pipe 100 may be coupled to another pipe 102 via the retaining clamp 40. Each pipe 100 includes a cylindrical body 104 and a flange 106 extending outwardly from the body 104. In the illustrative embodiment, the grooves 52 of the retaining clamp 40 are sized to receive the flanges 106 of the pipes 100, 102, as described in greater detail below. As shown in FIG. 6, the pipes 100, 102 define a longitudinal axis 108 that coaxial with the central axis 50 of the retaining clamp 40.

As shown in FIG. 6, each segment 44 of the retaining clamp 40 has a length 110 extending between ends 112, 114. In the illustrative embodiment, each length 110 is defined by the inner edge 54 of each segment 44, and the inner edge 54 defines a substantially straight line. Additionally, as shown in FIG. 6, the lengths 110 of the segments 44 are equal. A radial line 120 extends through the central axis 50 of the retaining clamp 40 and a midpoint 122 of each length 110. An angle β is defined between the inner edge 54 and the radial line 120. In the illustrative embodiment, the magnitude of the angle β is equal to approximately 90 degrees. Additionally, as shown in FIG. 6, a circle 124 is defined by the midpoints 122 of the segments 44.

As described above, each segment 44 includes an outer surface 72 that is positioned opposite the base wall 56. As shown in FIG. 6, the outer surface 72 of each segment 44 has a midpoint 126 that is radially aligned with the midpoint 122 of the corresponding inner edge 54 of that segment 44. As such, each radial line 120 extends through both midpoints 122, 126 of each segment 44. The midpoints 126 of the segments 44 cooperate to define an outer circle 128 that has a diameter greater than the circle 124.

Figure 7:
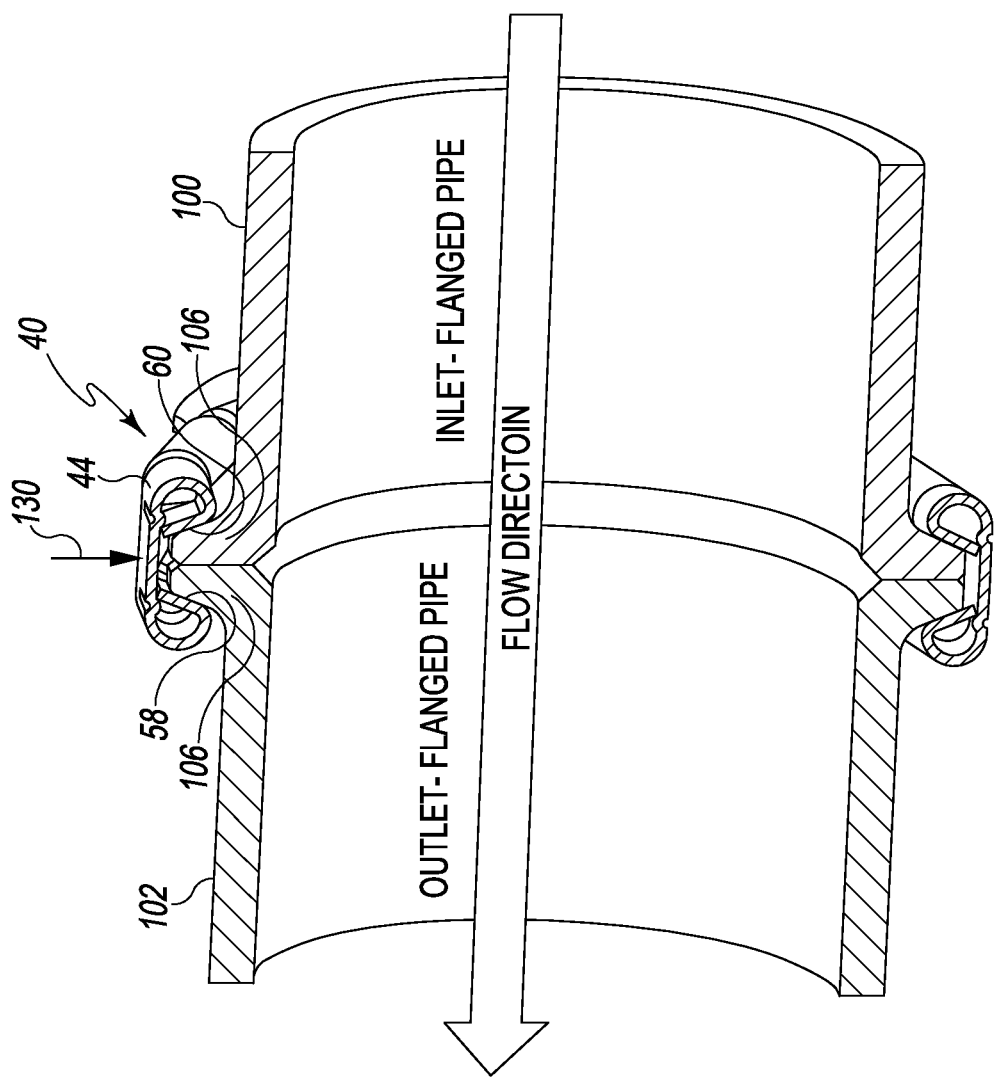
FIG. 7 is a cross-sectional view of the retaining clamp taken along the line 7-7 of FIG. 5.
Figure 8:
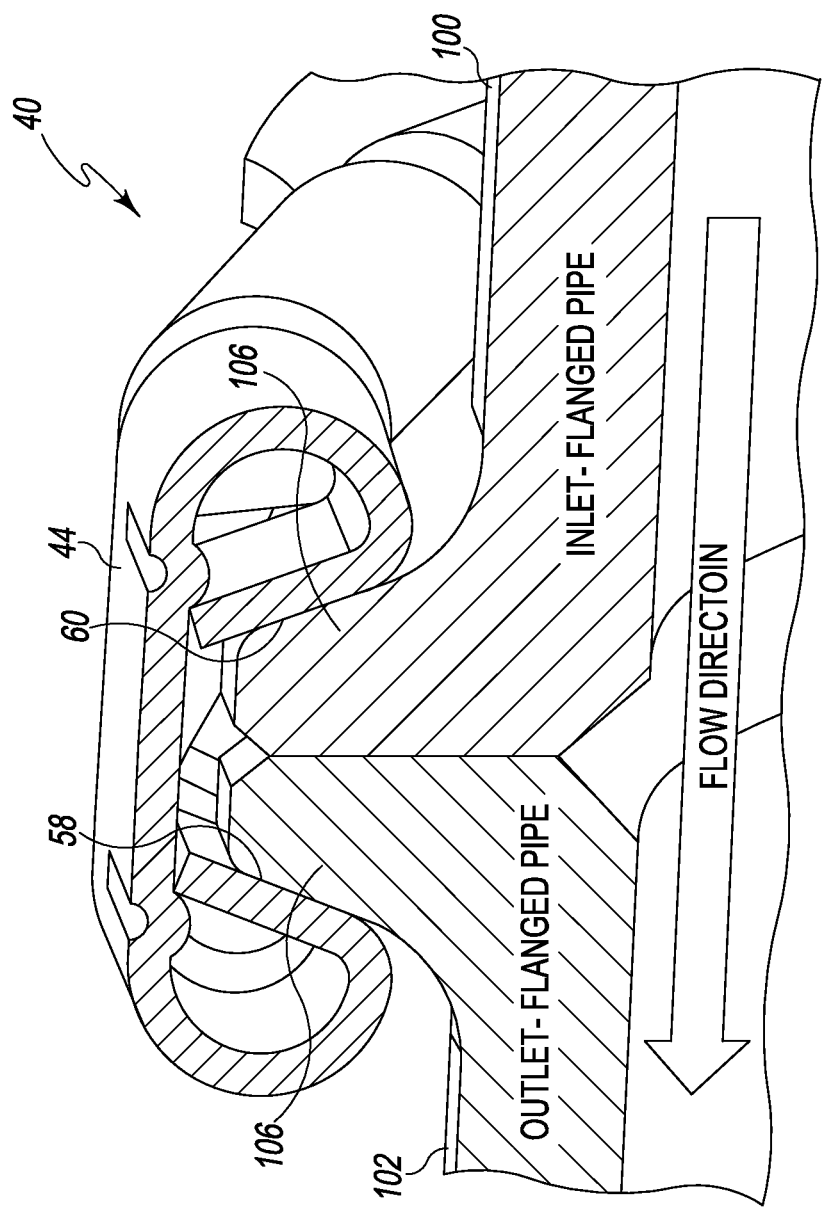
FIG. 8 is another cross-sectional view of the retaining clamp similar to FIG. 7.

As shown in FIGS. 7 and 8, when the retaining clamp 40 is coupled to the pipes 100, 102, the sidewalls 58, 60 of each segment 44 engages the flanges 106 of the pipes 100, 102. When the bolt 90 is tightened, the ends 84, 88 of the chain 42 are drawn toward one another, and an axial force in the direction indicated by arrow 130 in FIG. 7 is applied to the flanges 106, thereby securing the pipes 100, 102 together. Because the midpoints 122, 126 of the segments 44 lie on the radial lines 120, each segment 44 extends tangent to the flanges 106 of the pipes 100, 102. The depth of the contact between each segment 44 and the pipes 100, 102 is uniform, thereby promoting consistent and uniform axial loading on the flanges 106.

Figure 9:
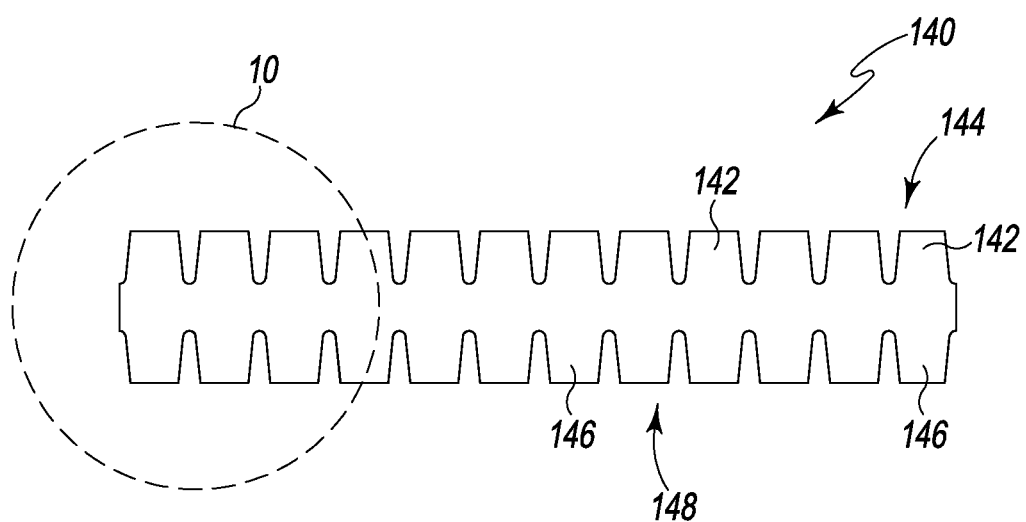
FIG. 9 is a plan view of a metal strip used to produce the retaining clamp of FIGS. 3-8.
Figure 10:
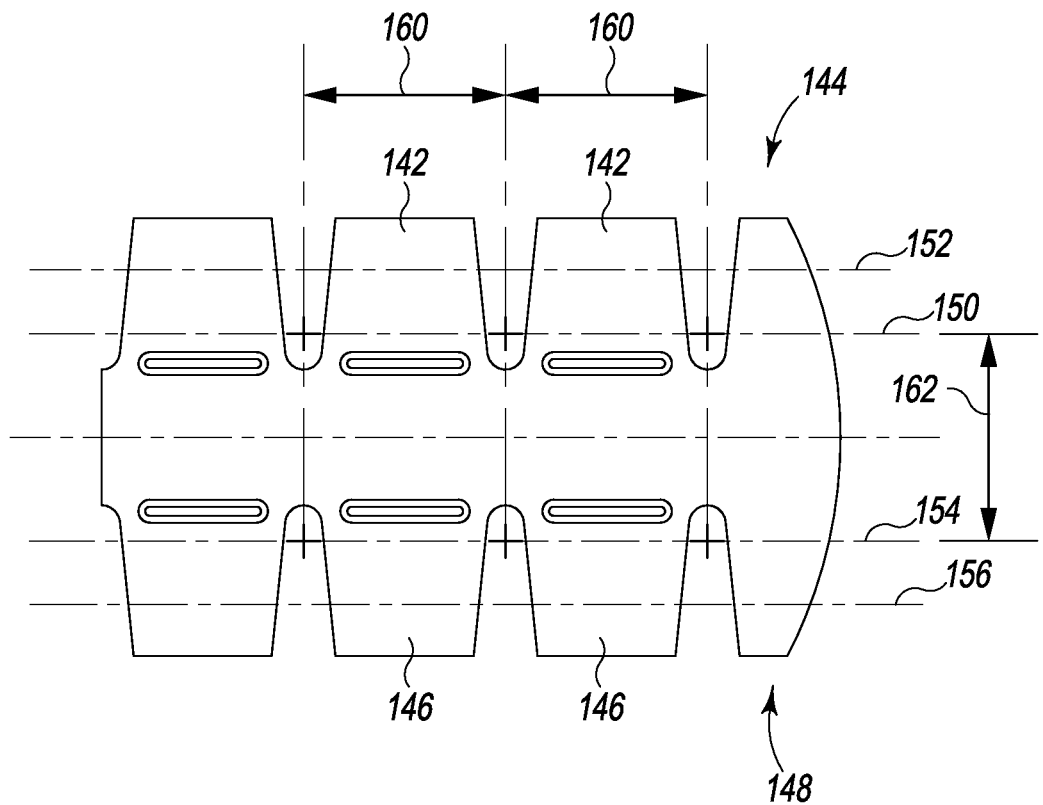
FIG. 10 is a plan view of a portion of the metal strip of FIG. 9.
Figure 11:
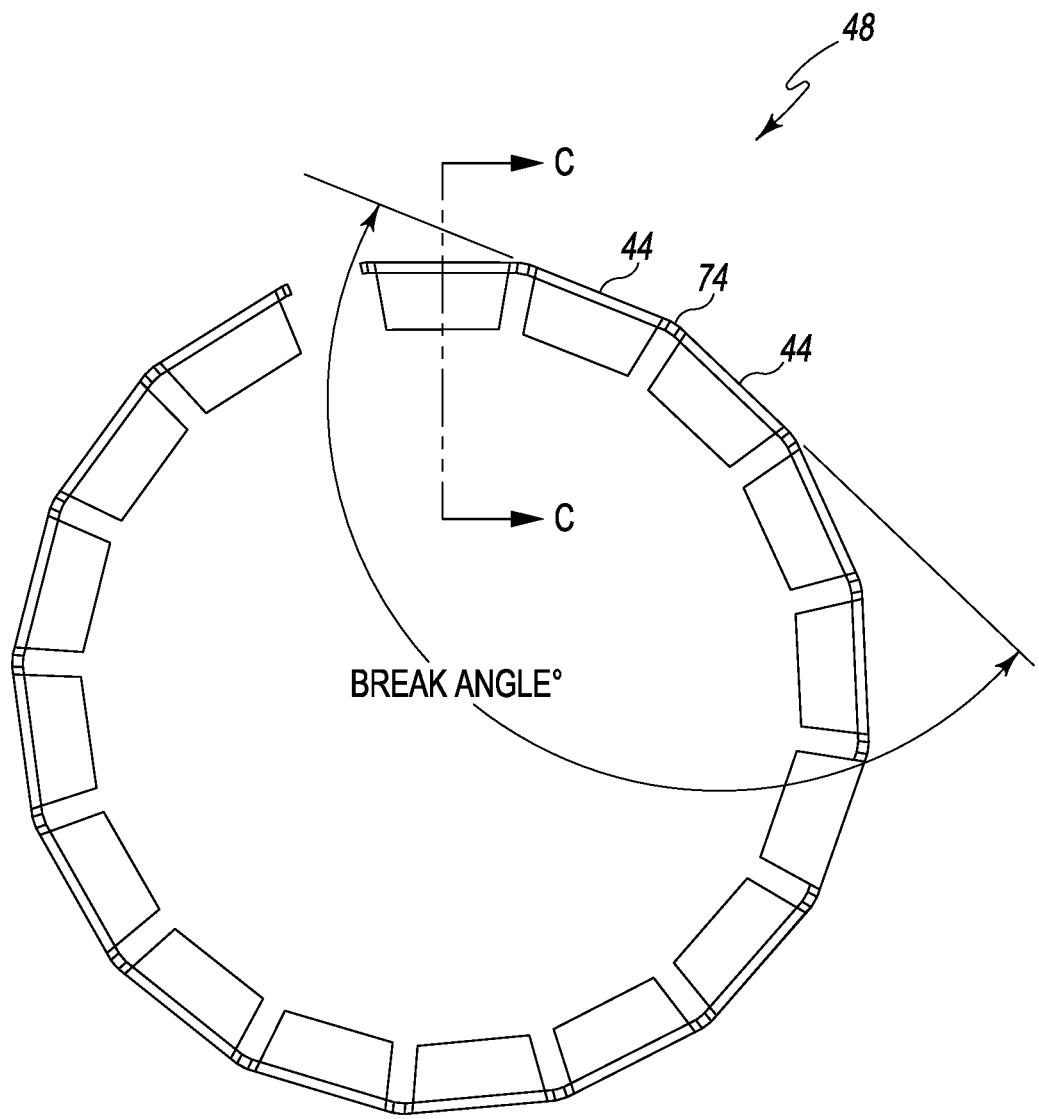
FIG. 11 is an elevation view of the metal strip of FIG. 9 formed into an annulus of the retaining clamp of FIGS. 3-8.

Referring now FIGS. 9-11, a method of manufacturing the chain 42 of segments 44 is shown. As shown in FIG. 9, a metal strip 140 is formed via stamping or other manufacturing method. The metal strip 140 includes a plurality of protrusions 142 extending from one side 144 and another plurality of protrusions 146 extending from the opposite side 148. As shown in FIG. 10, one of the protrusions 142 may be bent along an imaginary axis 150 and an imaginary axis 152 to form a side wall 58 of a segment 44 Similarly, one of the protrusions 146 may be bent along an imaginary axis 154 and an imaginary axis 156 to form a side wall 60 of the segment 44. As shown in FIG. 11, the strip 140 may be rolled about the living hinges 74 to form the annulus 48. The components of the locking mechanism 46 may then be attached.

It should be appreciated that the chain 42 may be produced by stamping and forming all segments 44 concurrently. In other embodiments, a metal strip may be fed into a die one pitch 160 (see FIG. 10) at a time such that one complete segment 44 with each stroke of the die. In the "one pitch" method, a relatively simple progressive die could have flexibility to produce a variety of pitches 160 having different lengths, apex widths and apex depths by making adjustments to the die. The adjustments to the length of the pitch 160 may be made by altering the length of material advanced with each stroke of the mechanical press that is used to house the die. The adjustments may also include the ability to accommodate multiple strip widths and adjustment to the center to center distances 162 of the cutouts between the protrusions, which may be moved inward and outward relative to the material edge.

It will be appreciated that the devices and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A retaining clamp comprising:
a chain of interconnected segments extending from a first end to a second end, the chain defining a central axis, and
a locking mechanism extending between the first end of the chain and the second end of the chain, the locking mechanism being operable to move the first end toward the second end,
wherein (i) a groove is defined in each segment of the chain of interconnected segments, the groove being defined by a base wall that faces the central axis and a pair of side walls having planar surfaces that extend obliquely relative to the base wall, (ii) an angle is defined between the planar surfaces of the pair of side walls of each segment, the angle having a magnitude of approximately 40 degrees, and (iii) a pair of detents is formed in the base wall of each segment to act as stops for the pair of side walls.

2. The retaining clamp of claim 1, wherein the groove of each segment has a depth defined between the base wall and an inner edge of the segment.

3. The retaining clamp of claim 2, wherein:
each segment extends from a first end to a second end and has an inner length defined between the first end and the second end, and
a radial line extends (i) through the central axis and a midpoint of the inner length of each segment and (ii) orthogonal to the inner edge of the segment.

4. The retaining clamp of claim 3, wherein the midpoints of the lengths of the segments define a circle, and the inner edge of each segment extends along a tangent line of the circle.

5. The retaining clamp of claim 4, wherein each segment has an outer surface that faces away from the central axis, the outer surface having a midpoint that is aligned with the midpoint of the inner length of the segment such that a radial line extends through the central axis, the midpoint of the inner length of the segment, and the midpoint of the outer surface of the segment.

6. The retaining clamp of claim 5, wherein:
the circle is a first circle having a first diameter,
the midpoints of the outer surfaces of the segments define a second circle having a second diameter greater than the first diameter, and
the outer surface of each segment extends along a tangent line of the second circle.

7. The retaining clamp of claim 5, wherein the outer surfaces of the segments define an outer perimeter of the retaining clamp.

8. The retaining clamp of claim 1, wherein the chain of interconnected segments are formed as a single monolithic component.

9. The retaining clamp of claim 8, wherein the chain of interconnected segments is formed from a single metallic strip.

10. The retaining clamp of claim 1, wherein the chain includes at least ten segments.

11. The retaining clamp of claim 1, wherein when the retaining clamp is coupled to a joint, a first side wall of each pair of side walls engages a first side of the joint and a second side wall of each pair of side walls engages a second side of the joint.

12. The retaining clamp of claim 11, wherein the locking mechanism applies a force to the chain of interconnected segments toward the central axis to secure the retaining clamp to the joint.

13. A retaining clamp comprising:
an annulus including a plurality of segments, the annulus defining a central axis, and
a locking mechanism coupled to the annulus, the locking mechanism being operable to contract the annulus,
wherein (i) a groove is defined in each segment between a pair of side walls having planar surfaces, the groove extending from an inner edge of each segment to a base wall facing the central axis, (ii) a radial line extends through the central axis and a midpoint of the inner edge of each segment orthogonal to the inner edge of the segment, and (iii) a pair of detents is formed in the base wall of each segment to act as stops for the pair of side walls.

14. The retaining clamp of claim 13, wherein the plurality of segments are formed from a single metallic strip.

15. The retaining clamp of claim 13, wherein the planar surfaces of the pair of side walls of each segment extend obliquely relative to the base wall of the segment.

16. The retaining clamp of claim 15, wherein an angle is defined between the planar surfaces of the pair of side walls of each segment, the angle having a magnitude of approximately 40 degrees.

17. The retaining clamp of claim 13, wherein the pair of detents are arranged to maintain an apex width of the groove when the retaining clamp is secured to a joint.

* * * * *